(12) United States Patent  
Jaiswal et al.

(10) Patent No.: US 11,829,226 B2  
(45) Date of Patent: Nov. 28, 2023

(54) ANOMALY DETECTION APPARATUS, ANOMALY DETECTION METHOD, AND ANOMALY DETECTION PROGRAM

(71) Applicant: Hitachi, Ltd., Tokyo (JP)

(72) Inventors: Satish Kumar Jaiswal, Tokyo (JP); Mineyoshi Masuda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/681,968

(22) Filed: Feb. 28, 2022

(65) Prior Publication Data

US 2022/0334909 A1 Oct. 20, 2022

(30) Foreign Application Priority Data

Apr. 20, 2021 (JP) .................. 2021-071101

(51) Int. Cl.
*G06F 11/00* (2006.01)
*G06F 11/07* (2006.01)

(52) U.S. Cl.
CPC ...... *G06F 11/0751* (2013.01); *G06F 11/0721* (2013.01)

(58) Field of Classification Search
CPC .................. G06F 11/0751; G06F 11/0721
USPC ...................................... 714/1–57
See application file for complete search history.

(56) References Cited

U.S. PATENT DOCUMENTS

| | | | | |
|---|---|---|---|---|
| 7,203,878 | B2 * | 4/2007 | Naegle | H04L 69/22 714/39 |
| 2002/0152415 | A1 * | 10/2002 | Franklin | G06F 3/0689 714/6.22 |
| 2003/0152282 | A1 * | 8/2003 | Trenary | H04N 19/85 375/E7.206 |
| 2004/0148047 | A1 | 7/2004 | Dismukes et al. | |
| 2007/0220400 | A1 * | 9/2007 | Toda | G06F 11/1068 714/763 |
| 2009/0077419 | A1 * | 3/2009 | Di Palma | G06F 11/3452 714/21 |
| 2014/0298097 | A1 * | 10/2014 | Illouz | G06F 11/0739 714/37 |
| 2018/0024904 | A1 * | 1/2018 | Gou | G06F 9/5044 714/41 |
| 2018/0189136 | A1 * | 7/2018 | Wang | H03M 13/616 |
| 2021/0367875 | A1 * | 11/2021 | Yamashita | G06F 21/55 |

* cited by examiner

*Primary Examiner* — Sarai E Butler
(74) *Attorney, Agent, or Firm* — Baker Botts L.L.P.

(57) ABSTRACT

To improve promptness of anomaly detection after occurrence of an event, provided is an anomaly detection apparatus including a processor that executes a program and a storage device that stores the program. The processor executes a correction process of applying a scale transformation to correct second predicted data in time-series first predicted data of a monitoring target, the second predicted data including data after occurrence time of a specific event, and a detection process of detecting an anomaly of the monitoring target based on the second predicted data corrected in the correction process and based on second measured data in time-series first measured data of the monitoring target, the second measured data including data after the occurrence time of the specific event.

9 Claims, 16 Drawing Sheets

FIG. 6

323 — CORRECTED PREDICTED RESULT TABLE

| TIME STAMP | CORRECTED PREDICTED DISK USAGE [%] | CORRECTED LOWER SERIES [%] | CORRECTED UPPER SERIES [%] |
|---|---|---|---|
| 2021-01-01 01:00:00 | 46 | 35 | 55 |
| 2021-01-01 01:15:00 | 25.5 | 20 | 30 |
| 2021-01-01 01:30:00 | 28 | 22.5 | 32.5 |
| 2021-01-01 01:45:00 | 30.5 | 25 | 35 |
| ... | ... | ... | ... |

AVERAGE ERROR CALCULATION EXAMPLE OF PREDICTED VALUE AND GROUND TRUTH DATA (S802)

| TIME STAMP 401 | DISK USAGE ($x_t$) (402) | PREDICTED DISK USAGE ($p_t$) (502) | ERROR $e(t)$ $\frac{|x_t - p_t|}{x_t}$ |
|---|---|---|---|
| [$T_{start}$] 2021-01-01 01:00:00 | 45 | 46 | 0.022 |
| 2021-01-01 01:15:00 | 25 | 51 | 1.040 |
| 2021-01-01 01:30:00 | 50 | 56 | 0.120 |
| [$T_{end}$] 2021-01-01 01:45:00 | 30 | 61 | 1.033 |
| | | AVERAGE ERROR E = | 0.554 |

ERROR THRESHOLD $E_{threshold}$=0.2

FIG. 10

CALCULATION EXAMPLE OF CHANGE RATE $r_t$ (S804)

| TIME STAMP 401 | DISK USAGE ($x_t$) (402) | CHANGE RATE $r_t$ (S804) | $r_t > R_{threshold}$? (S805) | |
|---|---|---|---|---|
| [$T_{start-1}$] 2021-01-01 00:45:00 | 40 | | | |
| [$T_{start}$] 2021-01-01 01:00:00 | 45 | 1.125 | NO | 1000 |
| 2021-01-01 01:15:00 | 25 | 1.800 | YES | 1001 |
| 2021-01-01 01:30:00 | 50 | 2.00 | YES | 1002 |
| [$T_{end}$] 2021-01-01 01:45:00 | 30 | 1.667 | YES | 1003 |
| | | NA | NA | 1004 |
| CHANGE RATE THRESHOLD $Ratio_{threshold}$=1.5 | | | | |

FIG.11

| CALCULATION EXAMPLE OF NUMBER OF APPEARANCES $f_r$ (S807) | | | |
|---|---|---|---|
| SELECTED TIME STAMP (S806) | CHANGE RATE $r_t$(S804) | NUMBER OF APPEARANCES $f_r$ (S807) | $f_r < F_{threshold}$? (S808) |
| 2021-01-01 01:00:00 | 1.800 | 1 | YES |
| 2021-01-01 01:15:00 | 2.00 | 1 | YES |
| 2021-01-01 01:30:00 | 1.667 | 1 | YES |
| $F_{threshold}$=2 per day | | | |

FIG. 14

| | | | CONCEPT DRIFT CANDIDATE POINT = 2021-01-01 01:00:00 | | |
|---|---|---|---|---|---|
| | | | CHANGE RATE $r_T = 25/45 = 0.5$ | | |
| | | | CHANGE DIFFERENCE $d_T = 25-45 = -20$ | | |
| TIME STAMP 401 | TEST DATA $x$ | PREDICTED DATA $p$ | SCALED PREDICTED DATA $(r_T * p_t)$ | SCALE ERROR $\left(\frac{|x_t - r_T * p_t|}{x_t}\right)$ | SHIFTED PREDICTED DATA $(p_t + d_T)$ | SHIFT ERROR $\left(\frac{|x_t - (p_t + d_T)|}{x_t}\right)$ |
| [T] 2021-01-01 01:00:00 | 45 | 46 | | | | |
| 2021-01-01 01:15:00 | 25 | 51 | 25.5 | 0.02 | 31 | 0.24 |
| 2021-01-01 01:30:00 | 50 | 56 | 28 | 0.44 | 36 | 0.28 |
| [$T_{end}$] 2021-01-01 01:45:00 | 30 | 61 | 30.5 | 0.017 | 41 | 0.367 |
| | | | SCALE ERROR $e^T_{scale} = 0.159$ | | SHIFT ERROR $e^T_{shift} = 0.296$ | |

| | CONCEPT DRIFT CANDIDATE POINT = 2021-01-01 01:15:00 | | | | |
|---|---|---|---|---|---|
| | CHANGE RATE $r_T = 50/25 = 2.0$ | | | | |
| | CHANGE DIFFERENCE $d_T = 50-25 = 25$ | | | | |
| TIME STAMP 401 | TEST DATA $x$ | PREDICTED DATA $p$ | SCALED PREDICTED DATA $(r_T * p_t)$ | SCALE ERROR $\left(\frac{|x_t - r_T * p_t|}{x_t}\right)$ | SHIFTED PREDICTED DATA $(p_t + d_T)$ | SHIFT ERROR $\left(\frac{|x_t - (p_t + d_T)|}{x_t}\right)$ |
| 2021-01-01 01:00:00 | 45 | 46 | | | | |
| [T] 2021-01-01 01:15:00 | 25 | 51 | | | | |
| 2021-01-01 01:30:00 | 50 | 56 | 112 | 1.24 | 81 | 0.62 |
| [$T_{end}$] 2021-01-01 01:45:00 | 30 | 61 | 122 | 3.067 | 86 | 1.867 |
| | | | SCALE ERROR $e_{scale}^T$ = 2.154 | | SHIFT ERROR $e_{shift}^T$ = 1.244 |

FIG.16

| | CONCEPT DRIFT CANDIDATE POINT = 2021-01-01 01:30:00 | | | | | |
|---|---|---|---|---|---|---|
| | | | CHANGE RATE $r_T = 30/50 = 0.6$ | | | |
| | | | CHANGE DIFFERENCE $d_T = 30-50 = -20$ | | | |
| TIME STAMP 401 | TEST DATA $x$ | PREDICTED DATA $p$ | SCALED PREDICTED DATA ($r_T * p_t$) | SCALE ERROR $\left(\frac{|x_t - r_T * p_t|}{x_t}\right)$ | SHIFTED PREDICTED DATA ($p_t + d_T$) | SHIFT ERROR $\left(\frac{|x_t - (p_t + d_T)|}{x_t}\right)$ |
| 2021-01-01 01:00:00 | 45 | 46 | | | | |
| 2021-01-01 01:15:00 | 25 | 51 | | | | |
| [T] 2021-01-01 01:30:00 | 50 | 56 | | | | |
| [$T_{end}$] 2021-01-01 01:45:00 | 30 | 61 | 36 | 0.2 | 41 | 0.367 |
| | | | SCALE ERROR $e_{scale}^T = 0.2$ | | SHIFT ERROR $e_{shift}^T = 0.367$ | |

ANOMALY DETECTION APPARATUS, ANOMALY DETECTION METHOD, AND ANOMALY DETECTION PROGRAM

CLAIM OF PRIORITY

The present application claims priority from Japanese patent application JP 2021-071101 filed on Apr. 20, 2021, the content of which is hereby incorporated by reference into this application.

BACKGROUND OF THE INVENTION

1. Field of the Invention

The present invention relates to an anomaly detection apparatus, an anomaly detection method, and an anomaly detection program for detecting an anomaly.

2. Description of the Related Art

Anomaly detection in an information technology (IT) system is used for specifying a behavior different from a normal behavior of the IT system in order to design an appropriate action plan and execute a smooth and efficient operation of the IT system.

However, the anomaly detection cannot be performed just after events such as configuration change due to addition or deletion of the capacity of a disk or a random-access memory (RAM), unexpected deletion of a large amount of log files, and transfer of a large amount of log files to a backup storage. This is because the events cause sudden concept drifts. It is predicted that the events will more frequently occur due to implementation of container-based microservice architectures. Therefore, it is important to allow the anomaly detection just after the events.

An apparatus, a system, a method, and a computer program product for drift detection and correction for predictive analytics are disclosed in U.S. Published Application No. 2004/0148047. In the apparatus, a prediction module applies a model to workload data to generate one or a plurality of predicted results. The workload data includes one or more records. The model includes one or a plurality of functions learned based on training data. A drift detection module detects a drift phenomenon related to one or a plurality of predicted results. A predicted time correction module corrects at least one predicted result in response to the drift phenomenon.

However, although the predicted time correction module corrects at least one predicted result in response to the drift phenomenon when the drift phenomenon is detected in U.S. Published Application No. 2004/0148047, measured data after the detection needs to be used as training data to relearn the functions. Therefore, it takes time to complete the relearning after the occurrence of the event. The anomaly may not be detected in the meantime, or the anomaly may be detected in a state where the relearning has not been performed, which leads to false detection.

SUMMARY OF THE INVENTION

An object of the present invention is to improve promptness of anomaly detection after occurrence of an event.

An aspect of the invention disclosed in the present specification provides an anomaly detection apparatus including: a processor that executes a program; and a storage device that stores the program, in which the processor executes: a correction process of applying a scale transformation to correct second predicted data in time-series first predicted data of a monitoring target, the second predicted data including data after occurrence time of a specific event; and a detection process of detecting an anomaly of the monitoring target based on the second predicted data corrected in the correction process and based on second measured data in time-series first measured data of the monitoring target, the second measured data including data after the occurrence time of the specific event.

According to the representative embodiment of the present invention, the promptness of the anomaly detection after the occurrence of an event can be improved. Other problems, configurations, and advantages will become apparent from the following description of embodiment.

BRIEF DESCRIPTION OF THE DRAWINGS

FIG. 6 is an explanatory diagram illustrating an example of a corrected predicted result table;

FIG. 9 is an explanatory diagram illustrating a calculation example of step S802;

FIG. 10 is an explanatory diagram illustrating a calculation example of step S804;

FIG. 11 is an explanatory diagram illustrating a calculation example of step S807;

FIG. 14 is an explanatory diagram illustrating a scale and shift calculation example 1 of each concept drift candidate point;

FIG. 15 is an explanatory diagram illustrating a scale and shift calculation example 2 of each concept drift candidate point; and FIG. 16 is an explanatory diagram illustrating a scale and shift calculation example 3 of each concept drift candidate point.

DESCRIPTION OF THE PREFERRED EMBODIMENT

Anomaly Detection Example

Figure 1:
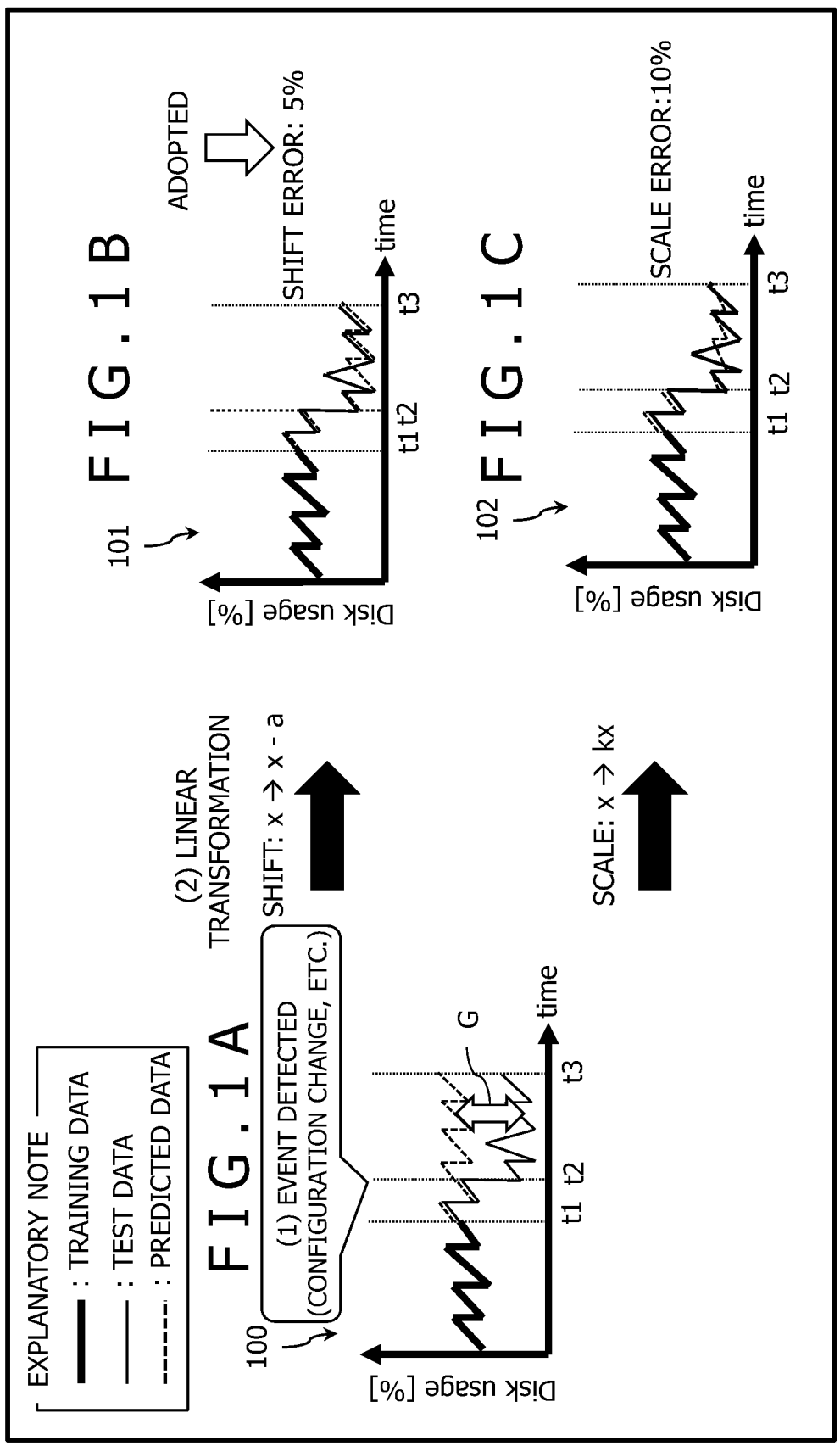
FIGS. 1A to 1C are explanatory diagrams illustrating an anomaly detection example of an anomaly detection apparatus.

FIGS. 1A to 1C are explanatory diagrams illustrating an anomaly detection example of an anomaly detection apparatus. An object to be monitored is, for example, the disk usage of an IT infrastructure. In the graphs of FIGS. 1A to 1C, the horizontal axis represents the time axis, and the vertical axis represents the disk usage. Although an example of the disk usage will be described in the present embodiment, RAM usage may be monitored. The training data includes time series measured values of up to time t1 that are used for creating a time series model. The predicted data includes time series predicted values of time t1 to t3 that are output from the time series model. The test data includes time series measured values (ground truth data) of time t1 to t3 that are compared with the predicted data.

The difference between the predicted data and the test data is within an acceptable range from time t1 to time t2, and this indicates that the prediction using the time series model is correct.

(1) It is assumed that an event is detected at time t2. The event here is a behavior that unexpectedly changes the disk usage, such as configuration change due to addition or deletion of the capacity of a disk or a RAM, unexpected deletion of a large amount of log files, and transfer of a large amount of log files to a backup storage.

The disk usage repeats a normal behavior after the event. However, the disk usage suddenly changes from time t2, and there is a difference G between the test data and the predicted data after time t2. The behavior of the disk usage before and after the event is called a concept drift. In some cases, the anomaly detection apparatus detects an anomaly even though the behavior of the disk usage is normal, and in other cases, the anomaly detection apparatus does not detect an anomaly even though the behavior of the disk usage is anomalous.

(2) Therefore, the anomaly detection apparatus linearly transforms the predicted data after time t2. The anomaly detection apparatus shifts the predicted data after time t2 in FIG. 1B and scales (enlarges and reduces) the predicted data after time t2 by a factor of k in FIG. 1C. The anomaly detection apparatus compares the difference (shift error) between the predicted data after the shift in FIG. 1B and the test data with the difference (scale error) between the predicted data after the scale in FIG. 1C and the test data. The anomaly detection apparatus selects the difference with a smaller error. In FIGS. 1B and 1C, the shift error is 5%, and the scale error is 10%. Therefore, the shift transformation is adopted. In this way, the linear transformation result is also used even just after time t2 at which the event is detected, and the anomaly can also be detected after time t2.

System Configuration Example

Figure 2:
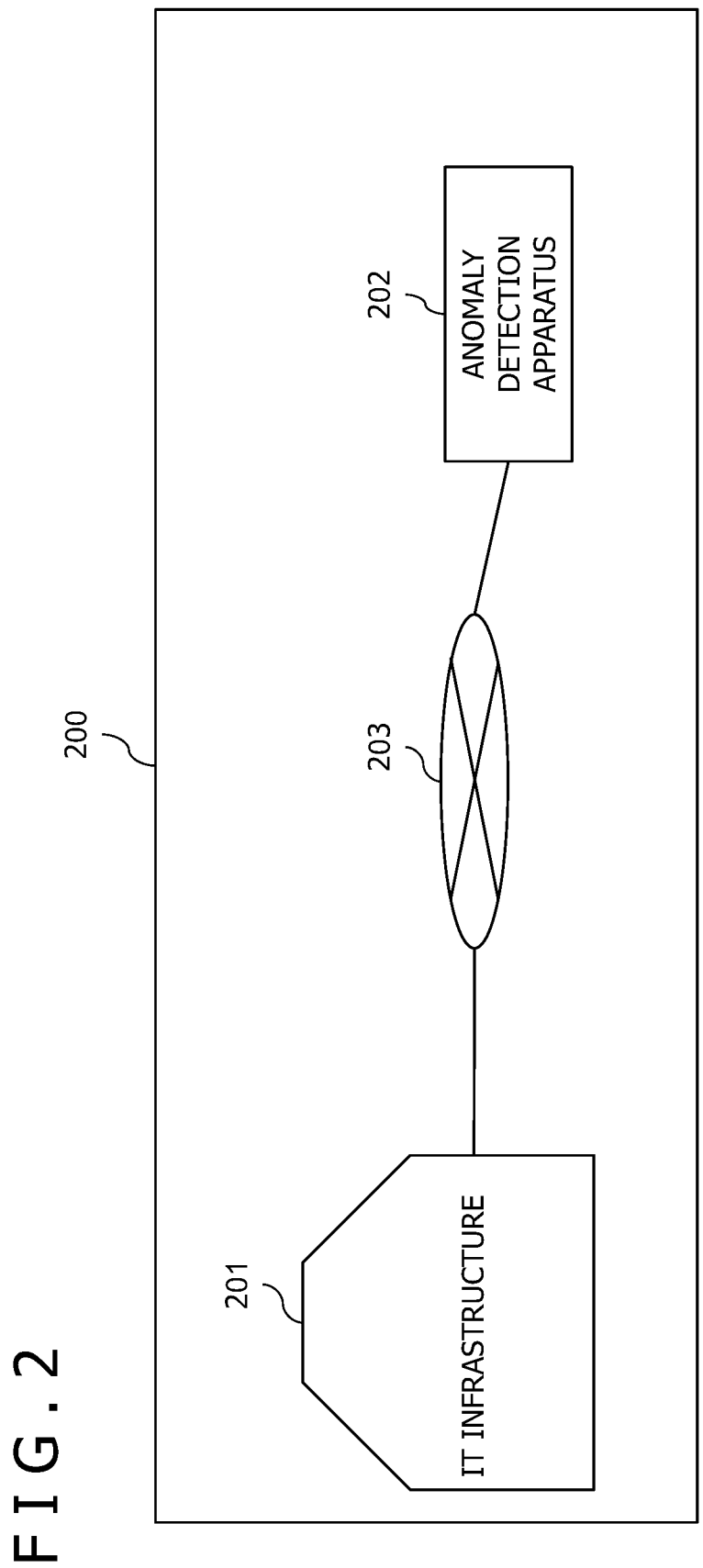
FIG. 2 is an explanatory diagram illustrating a system configuration example of an anomaly detection system.

FIG. 2 is an explanatory diagram illustrating a system configuration example of an anomaly detection system. An anomaly detection system 200 includes an IT infrastructure 201 and an anomaly detection apparatus 202. The IT infrastructure 201 and the anomaly detection apparatus 202 are connected to each other for communication through a network 203 such as the Internet, a local area network (LAN), and a wide area network (WAN).

Hardware Configuration Example of Anomaly Detection Apparatus

Figure 3:
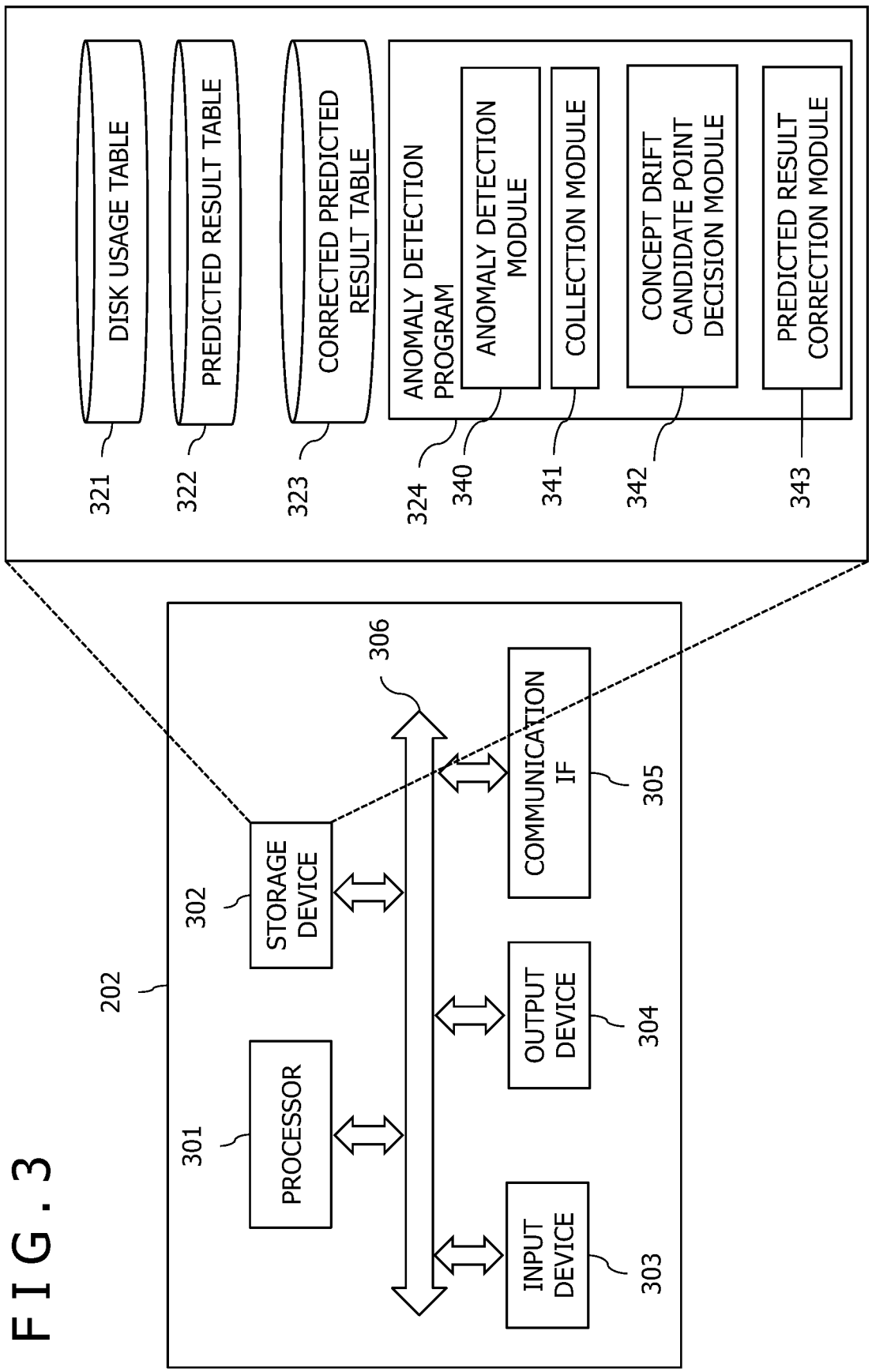
FIG. 3 is a block diagram illustrating a hardware configuration example of the anomaly detection apparatus.

FIG. 3 is a block diagram illustrating a hardware configuration example of the anomaly detection apparatus. The anomaly detection apparatus 202 includes a processor 301, a storage device 302, an input device 303, an output device 304, and a communication interface (communication IF) 305. The processor 301, the storage device 302, the input device 303, the output device 304, and the communication IF 305 are connected to each other through a bus 306. The processor 301 controls the anomaly detection apparatus 202. The storage device 302 is a work area of the processor 301. In addition, the storage device 302 is a non-transitory or transitory recording medium that stores various programs and pieces of data. Examples of the storage device 302 include a read only memory (ROM), a RAM, a hard disk drive (HDD), and a flash memory. The input device 303 is used to input data. Examples of the input device 303 include a keyboard, a mouse, a touch panel, a numeric keypad, a scanner, and a microphone. The output device 304 is used to output data. Examples of the output device 304 include a display, a printer, and a speaker. The communication IF 305 is connected to the network 203 to transmit and receive data.

The data stored in the storage device 302 will be specifically described. The storage device 302 includes a disk usage table 321, a predicted result table 322, a corrected predicted result table 323, and an anomaly detection program 324. The disk usage table 321 is a table storing the disk usage in time series, and this will be described later in FIG. 4. The predicted result table 322 is a table storing predicted results in time series, and this will be described later in FIG. 5. The corrected predicted result table 323 is a table storing corrected predicted results in time series, and this will be described later in FIG. 6.

The anomaly detection program 324 is a program for the processor 301 to detect an anomaly occurred in the IT infrastructure 201, and the anomaly detection program 324 includes program modules including an anomaly detection module 340, a collection module 341, a concept drift candidate point decision module 342, and a predicted result correction module 343. The anomaly detection module 340 is a program module that compares the test data with the predicted data to detect an anomaly of the disk usage. The collection module 341 is a program module that collects metric data from the IT infrastructure 201, and this will be described later in FIG. 7. The concept drift candidate point decision module 342 is a program module that decides a concept drift candidate point, and this will be described later in FIGS. 8 to 11. The concept drift candidate point is a candidate for the detection time of an event that may cause a concept drift. The predicted result correction module 343 is a module that corrects the predicted results stored in the predicted result table 322, and this will be described later in FIGS. 12 and 13.

Tables

The disk usage table 321, the predicted result table 322, and the corrected predicted result table 323 stored in the storage device 302 will be described with reference to FIGS. 4 to 6.

Figure 4:
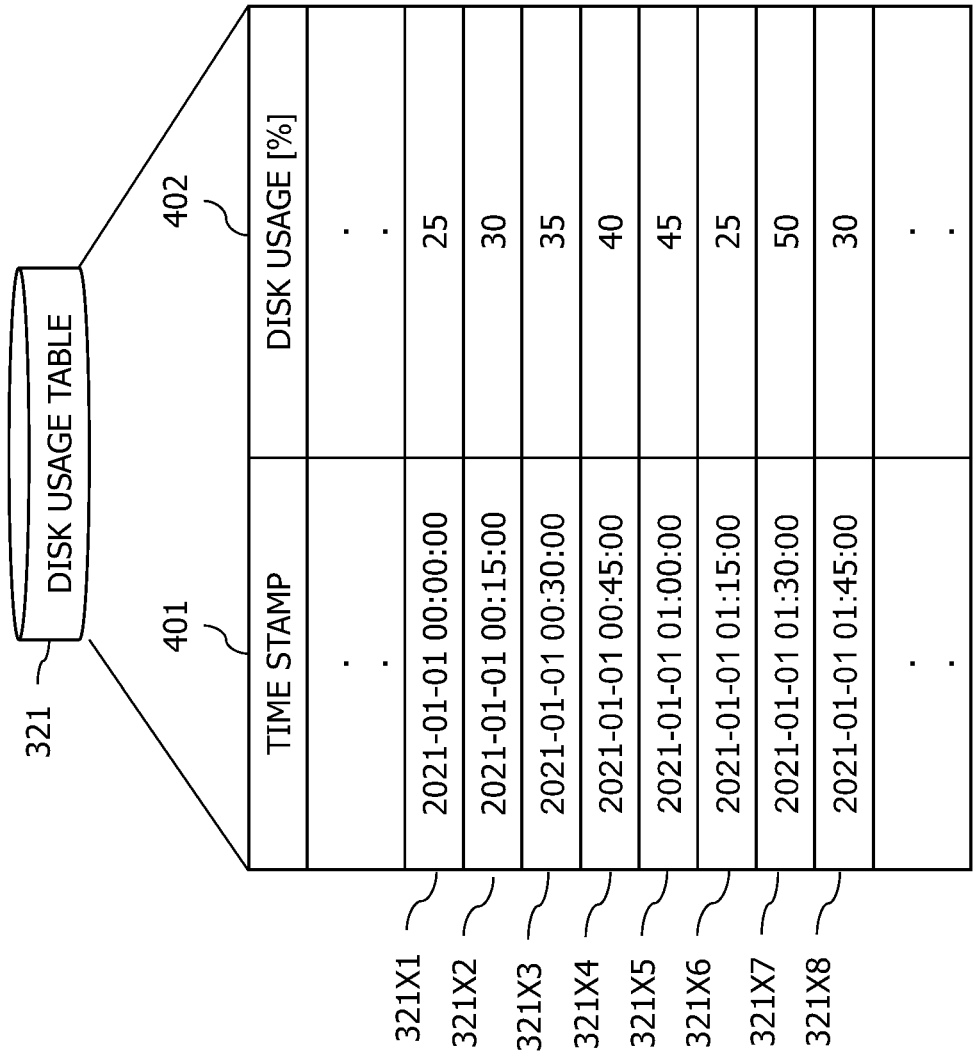
FIG. 4 is an explanatory diagram illustrating an example of a disk usage table.

FIG. 4 is an explanatory diagram illustrating an example of the disk usage table 321. The disk usage table 321 includes fields including a time stamp 401 and disk usage 402. The time stamp 401 indicates the date and time of the measurement of the disk usage 402 measured by the IT infrastructure 201. The disk usage 402 indicates the proportion of the capacity of the used disk to the entire disk capacity of the IT infrastructure 201.

In FIG. 4, the time stamp 401 is stored, for example, every 15 minutes. The disk usage 402 is on the rise until an entry 321X5, and the disk usage 402 rises 5% every 15 minutes. Although the disk usage 402 is predicted to be 50% in an entry 321X6, the disk usage 402 has suddenly dropped to 25%. The reason that the disk usage 402 has unexpectedly dropped to a half the prediction (50%) is that the disk capacity of the IT infrastructure 201 has doubled from 10 GB to 20 GB after "2021-01-01 01:00:00" that is the time stamp 401 of the entry 321X5.

The disk usage 402 has suddenly increased at "2021-01-01 01:30:00" that is the time stamp 401 of an entry 321X7. Although the disk usage 402 is predicted to be 27.5% in the entry 321X7, the measured value is 50%. It can be understood that an anomaly has occurred in the entry 321X7. That is, the disk usage 402 of the entry 321X7 is an anomalous value. The anomaly detection apparatus 202 detects that an anomaly has occurred in the time stamp 401 of the entry 321X7.

Figure 5:
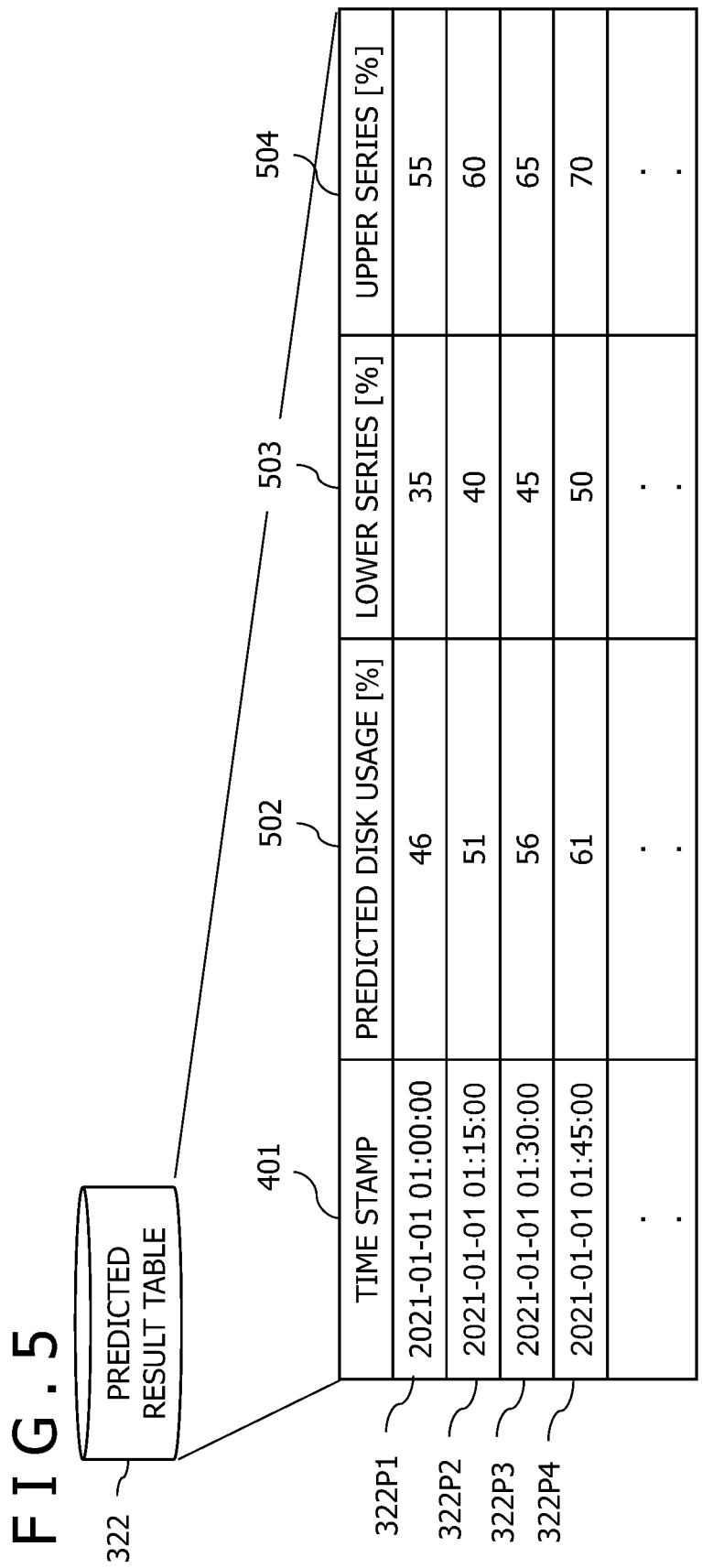
FIG. 5 is an explanatory diagram illustrating an example of a predicted result table.

FIG. 5 is an explanatory diagram illustrating an example of the predicted result table 322. The predicted result table 322 includes fields including the time stamp 401, predicted disk usage 502, a lower series 503, and an upper series 504. The predicted disk usage 502 represents a predicted value of the disk usage 402 output when the time stamp 401 is input as an objective variable to the time series model. Other than the time stamp 401, parameters such as days of the week and holidays may also be input to the time series model.

An interval between the lower series 503 and the upper series 504 will be referred to as a prediction interval. The prediction interval is, for example, a confidence interval of 95%. The value of the lower series 503 and the value of the upper series 504 are calculated on the basis of, for example, −3σ and +3σ of the predicted disk usage 502 of the entry (σ represents a standard deviation). Values smaller than the lower series 503 and values larger than the upper series 504 are included in a rejection region.

The prediction interval may be set in percentile. In this case, the lower series 503 is in the 10th percentile, and the upper series 504 is in the 90th percentile, for example. That is, the first to ninth smallest values of the predicted disk usage 502 and the 91st and subsequent values of the predicted disk usage 502 are included in the rejection region.

The lower series 503 and the upper series 504 are used for the anomaly detection. The disk usage 402 is detected as an anomalous value if the disk usage 402 is lower than the lower series 503 or higher than the upper series 504. In other words, the disk usage 402 is not detected as an anomalous value when the disk usage 402 is included in the prediction interval.

FIG. 6 is an explanatory diagram illustrating an example of the corrected predicted result table 323. The corrected predicted result table 323 includes fields including the time stamp 401, a corrected predicted disk usage 602, a corrected lower series 603, and a corrected upper series 604. The corrected predicted disk usage 602 represents the predicted disk usage 502 corrected by a linear transformation. The corrected lower series 603 represents the lower series 503 corresponding to the corrected predicted disk usage 602. The corrected upper series 604 represents the upper series 504 corresponding to the corrected predicted disk usage 602.

Anomaly Detection Procedure Example

Figure 7:
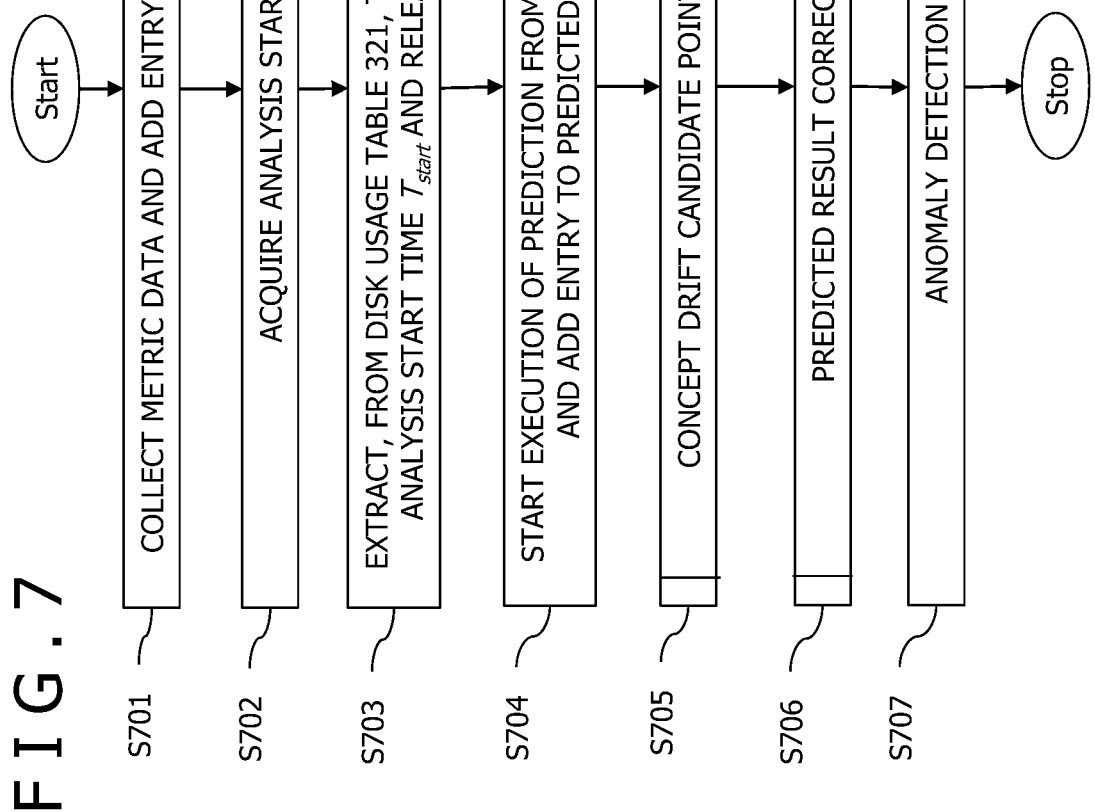
FIG. 7 is a flow chart illustrating an anomaly detection procedure example of the anomaly detection apparatus.

FIG. 7 is a flow chart illustrating an anomaly detection procedure example of the anomaly detection apparatus 202. Steps S701 to S704 are executed by the collection module 341. Step S705 is executed by the concept drift candidate point decision module 342. Step S706 is executed by the predicted result correction module 343. The anomaly detection apparatus 202 starts the process illustrated in FIG. 7 when, for example, a certain number of unanalyzed entries are stored in the disk usage table 321.

The anomaly detection apparatus 202 collects metric data from the IT infrastructure 201 and adds an entry to the disk usage table 321 (step S701). One entry of the disk usage table 321 includes, for example, statistics of the disk usage 402 at a plurality of time points. The statistics include, for example, an average value, a median, a maximum value, or a minimum value of the disk usage 402 at a plurality of time points.

The time stamp 401 of the disk usage table 321 is recorded at 15 minute intervals. Therefore, when, for example, the IT infrastructure 201 measures the disk usage 402 at one minute intervals, the IT infrastructure 201 measures the disk usage 402 for 15 times and calculates the statistics of the disk usage 402 corresponding to the 15 times of measurement. The IT infrastructure 201 transmits the last measurement time of the 15 times of measurement and the statistics of the disk usage 402 of the 15 times of measurement, to the anomaly detection apparatus 202. The anomaly detection apparatus 202 records the received last measurement time in the time stamp 401 and records the statistics of the disk usage 402 of the 15 times of measurement in the disk usage 402.

Next, the anomaly detection apparatus 202 acquires analysis start time $T_{start}$ (step S702). The analysis start time $T_{start}$ is the time stamp 401 of the entry of the disk usage table 321 in which the anomaly detection apparatus 202 starts the analysis of step S703. That is, the analysis start time $T_{start}$ is the time stamp 401 of an unanalyzed oldest entry in the disk usage table 321. For example, assuming that the anomaly detection process is completed up to the entry 321X4 in the disk usage table 321, the value "2021-01-01 01:00:00" of the time stamp 401 of the next entry 321X5 is the analysis start time $T_{start}$.

Next, the anomaly detection apparatus 202 extracts, from the disk usage table 321, time series data including an entry group of up to the analysis start time $T_{start}$ not used for relearning of a time series model and relearns the time series model (step S703). The time series model is, for example, a function expressed as follows.

$$y=f(t) \quad (1)$$

On the left side, y represents the disk usage 402. On the right side, t represents time data which is, for example, the time stamp 401. Other than the time stamp 401, a type of the day of the week (weekday or holiday) may also be input as the time data t.

For example, if the entries up to just before the entry 321X1 are already learned and the entries 321X1 to 321X4 are included in the entry group of up to the analysis start time $T_{start}$ not used for relearning of the time series model, the anomaly detection apparatus 202 inputs the time stamps 401 of the entries 321X1 to 321X4 to the time data t of the time series model and relearns the time series model to minimize the differences between the output results y and the disk usage 402 of the entries 321X1 to 321X4. Note that, when the time series model is not generated, the anomaly detection apparatus 202 extracts, from the disk usage table 321, time series data including the entry group of up to the analysis start time $T_{start}$ and relearns the time series model.

Note that the time series model may be a random forest or may be an autoregressive integrated moving average (ARIMA) model or a seasonal ARIMA (SARIMA) model.

Next, the anomaly detection apparatus 202 starts the execution of the prediction from the analysis start time $T_{start}$ and adds entries to the predicted result table 322 (step S704). Specifically, for example, the anomaly detection apparatus 202 sequentially inputs the time stamps 401 from the analysis start time $T_{start}$ to the latest time to the time data t of the time series model of Equation (1) relearned in step S703 and outputs, as y of Equation (1), predicted data p of the disk usage 402 of each time stamp 401. The anomaly detection apparatus 202 records y as the predicted disk usage 502 in the predicted result table 322, along with the time stamps 401. The anomaly detection apparatus 202 calculates the value of the lower series 503 and the value of the upper series 504 for each of the sequentially input time stamps 401 and records the values in the predicted result table 322.

An entry not detected as an anomaly by the anomaly detection module 340 will be described. For example, the disk usage 402 (50%) of the entry 321X7 is an anomalous value. However, the value of the lower series 503 is "45%" and the value of the upper series 504 is "65%" in an entry 322P3 of the predicted result table 322 with the same time stamp 401 as the entry 321X7.

Accordingly, the disk usage 402 (50%) of the entry 321X7 that is an anomalous value is included in the prediction interval [45, 65] between the value "45%" of the lower series 503 and the value "65%" of the upper series 504. Therefore, the disk usage 402 (50%) of the entry 321X7 is not detected as an anomalous value. This is because the effect of doubling the disk capacity of the IT infrastructure 201 is overlooked in the relearned time series model f.

The anomaly detection apparatus 202 executes a concept drift candidate point decision process (step S705) and a predicted result correction process (step S706) to correct the predicted disk usage 502. In this way, the anomaly detection apparatus 202 detects, as an anomalous value, the disk usage 402 (50%) of the entry 321X7 overlooked and handled as a normal value by the anomaly detection module 340 (step S707).

Concept Drift Candidate Point Decision Process (Step S705)

Figure 8:
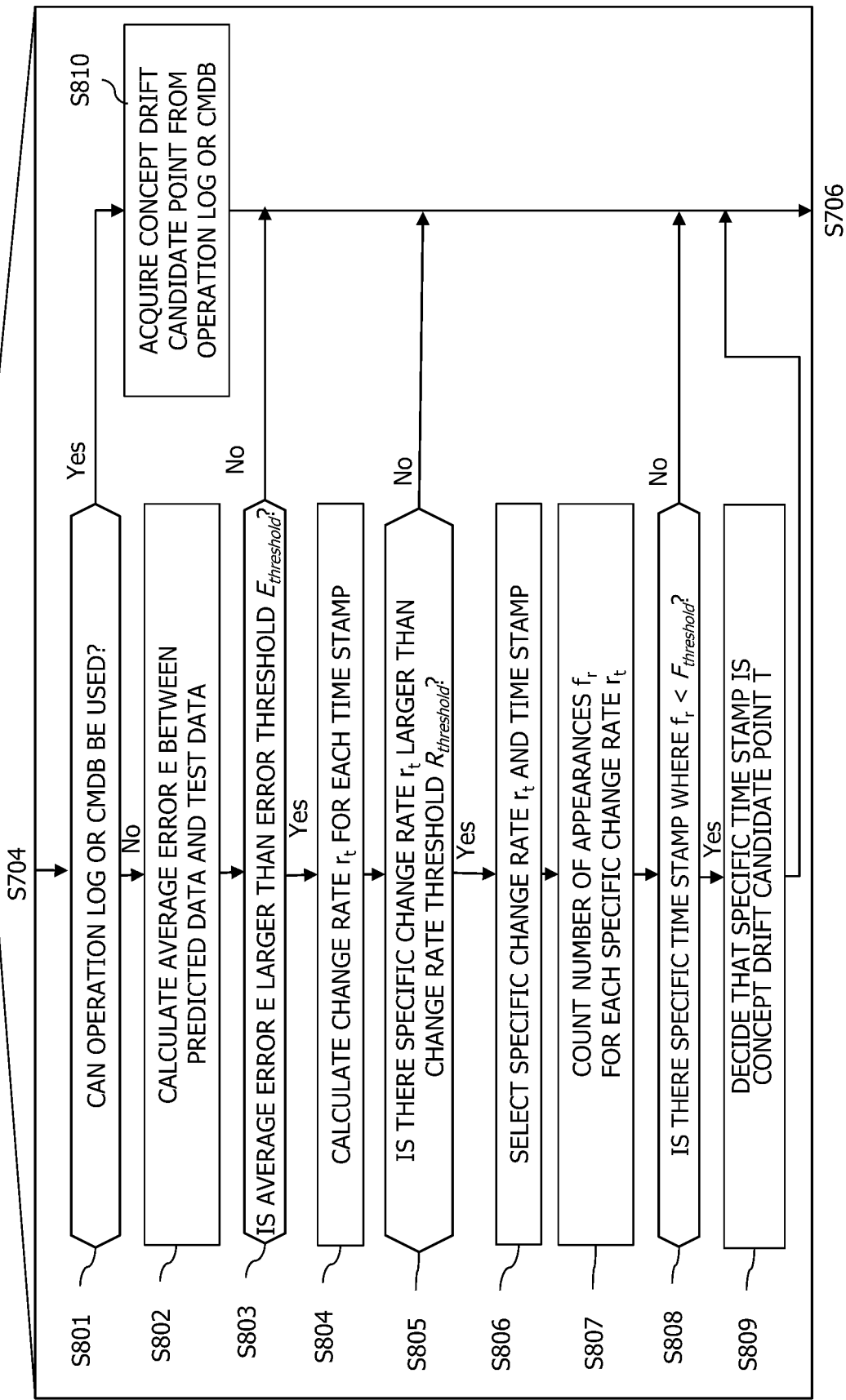
FIG. 8 is a flow chart illustrating a detailed procedure example of a concept drift candidate point decision process (step S705) illustrated in FIG. 7.

FIG. 8 is a flow chart illustrating a detailed procedure example of the concept drift candidate point decision process (step S705) illustrated in FIG. 7. After step S704, the anomaly detection apparatus 202 determines whether or not an operation log or a configuration management database (CMDB) can be used (step S801). If either the operation log or the CMDB in the IT infrastructure 201 can be used (step S801: Yes), the anomaly detection apparatus 202 acquires a concept drift candidate point from the operation log or the CMDB (step S810) and proceeds to the predicted result correction process (step S706).

On the other hand, if neither the operation log nor the CMDB can be used (step S801: No), the anomaly detection apparatus 202 calculates an average error between predicted data and test data (step S802). The predicted data includes the predicted disk usage 502, and the test data includes the disk usage 402 with the same time stamp 401 as the predicted data and is also called ground truth data. The average error is an average value of errors based on the difference between the predicted data and the test data of each time stamp 401. The error is, for example, the difference G illustrated in FIG. 1A and is expressed by the following Equation (2). The average error is expressed by the following Equation (3).

[Math. 1]

$$e(t) = \frac{|x_t - p_t|}{x_t} \quad (2)$$

$$E = \frac{1}{n} \sum_{t=T_{start}}^{t=T_{end}} \frac{|x_t - p_t|}{x_t} \quad (3)$$

In Equations (2) and (3), $x_t$ represents the test data, $p_t$ represents the predicted disk usage 502, and t represents the time stamp 401. In Equations (2) and (3), e(t) represents the error when the time stamp 401 is t, and E represents the average value of n errors e(t), that is, the average error, from the analysis start time $T_{start}$ to $T_{end}$. $T_{end}$ represents analysis end time indicated by the time stamp 401 of an nth entry from the entry of the analysis start time $T_{start}$.

Next, the anomaly detection apparatus 202 determines whether or not the average error E calculated in step S802 is larger than an error threshold $E_{threshold}$ (step S803). If the average error E is not larger than the error threshold $E_{threshold}$ (step S803: No), the anomaly detection apparatus 202 proceeds to the predicted result correction process (step S706). On the other hand, if the average error E is larger than the error threshold $E_{threshold}$ (step S803: Yes), the anomaly detection apparatus 202 proceeds to step S804. In the present example, the error threshold $E_{threshold}$ is, for example, $E_{threshold}$=0.2. If the average error E is larger than the error threshold $E_{threshold}$, it is predicted that a sudden concept drift is occurring. The concept drift with the average error E larger than the error threshold $E_{threshold}$ will be referred to as a sudden concept drift.

If the average error E is larger than the error threshold $E_{threshold}$ (step S803: Yes), the anomaly detection apparatus 202 calculates a change rate $r_t$ of the test data for each time stamp 401 (step S804). The change rate $r_t$ is calculated by, for example, the following (4).

[Math. 2]

$$(r_t, T_{start-1} \leq t < T_{end}) = \begin{cases} \frac{x_{t+1}}{x_t}, & 0 < x_t < x_{t+1} \\ \frac{x_{t+1}}{1+x_t}, & 0 = x_t < x_{t+1} \\ \frac{x_t}{x_{t+1}}, & x_t \geq x_{t+1} > 0 \\ \frac{x_t}{1+x_{t+1}}, & x_t \geq x_{t+1} = 0 \end{cases} \quad (4)$$

The change rate $r_t$ is calculated based on the ratio of test data $x_t$ at time t to test data $x_{t+1}$ at time t+1. The anomaly detection apparatus 202 determines whether or not there is a specific change rate $r_t$ larger than a change rate threshold $R_{threshold}$ among the change rates of the time stamps 401 (step S805). If there is no specific change rate $r_t$ (step S805: No), the anomaly detection apparatus 202 proceeds to the predicted result correction process (step S706). On the other hand, if there are one or more specific change rates $r_t$ (step S805: Yes), the anomaly detection apparatus 202 proceeds to step S806. The user can set the change rate threshold $R_{threshold}$ as desired.

The anomaly detection apparatus 202 selects the specific change rate $r_t$ and the time t indicated by the time stamp 401 (step S806). For each specific rate $r_t$, the anomaly detection apparatus 202 counts the number of times that the specific change rate $r_t$ is selected in step S806 in a predetermined period (for example, one day) (step S807). The number of times that the specific change rate $r_t$ is selected will be referred to as the number of appearances $f_r$ of the specific change rate $r_t$. Note that the specific change rate $r_t$ may be counted only in the case of complete matching or may be counted when the change rate $r_t$ is within an acceptable range. For example, when the change rate $r_t$ is 1.804 or 1.863, the change rate $r_t$ is counted as the number of appearances $f_r$ of specific change rate $r_t$=1.8.

Subsequently, the anomaly detection apparatus 202 determines whether or not there is a specific time stamp 401 in which the number of appearances $f_r$ is smaller than a number-of-appearances threshold $F_{threshold}$ (step S808). If there is no specific time stamp 401 in which the number of appearances $f_r$ is smaller than the number-of-appearances threshold $F_{threshold}$ (step S808: No), the anomaly detection apparatus 202 proceeds to the predicted result correction process (step S706).

On the other hand, if there are one or more specific time stamps 401 in which the number of appearances $f_r$ is smaller than the number-of-appearances threshold $F_{threshold}$ (step S808: Yes), the anomaly detection apparatus 202 decides that the specific time stamp 401 is a concept drift candidate point (step S809), and proceeds to the predicted result correction process (step S706). The fact that the specific change rate $r_t$ appears equal to or more than the number-of-appearances threshold $F_{threshold}$ does not indicate that the specific change rate $r_t$ and the time stamp 401 represent a change in the disk usage 402 caused by a concept drift, but it indicates that the disk usage 402 is changed in a way different from a normal behavior. Therefore, the anomaly detection apparatus 202 predicts that it seems that a sudden concept drift has occurred at the time indicated by the specific time stamp 401 in which the number of appearances $f_r$ is smaller than the number-of-appearances threshold $F_{threshold}$.

Next, an execution example of the concept drift candidate point decision process (step S705) will be described with reference to FIGS. 9 to 11.

FIG. 9 is an explanatory diagram illustrating a calculation example of step S802. In FIG. 9, the time stamp 401 as the analysis start time is "2021-01-01 01:00:00," and the time stamp 401 as the analysis end time is "2021-01-01 01:45:00." In the case of FIG. 9, the average error E is larger than the error threshold $E_{threshold}$ (step S802: Yes), and the process proceeds to step S804.

FIG. 10 is an explanatory diagram illustrating a calculation example of step S804. An entry 1000 indicates a calculation result of the time stamp 401 just before the analysis start time $T_{start}$ (that is, the analysis end time $T_{end}$ of the last analysis). The change rate is not calculated in an entry 1004, and the determination of step S804 is not executed. In FIG. 10, it can be understood that each change rate $r_t$ of entries 1001 to 1003 is a specific change rate larger than the change rate threshold $R_{threshold}$.

FIG. 11 is an explanatory diagram illustrating a calculation example of step S807. In entries 1101 to 1103, the number of appearances $f_r$ of each specific change rate $r_t$ is "1" which is smaller than the number-of-appearances threshold $F_{threshold}$. Therefore, it is decided that the time stamps 401 of the entries 1001 to 1003 selected in step S806 are specific time stamps 401 (step S809).

Predicted Result Correction Process (Step S706)

Figure 12:
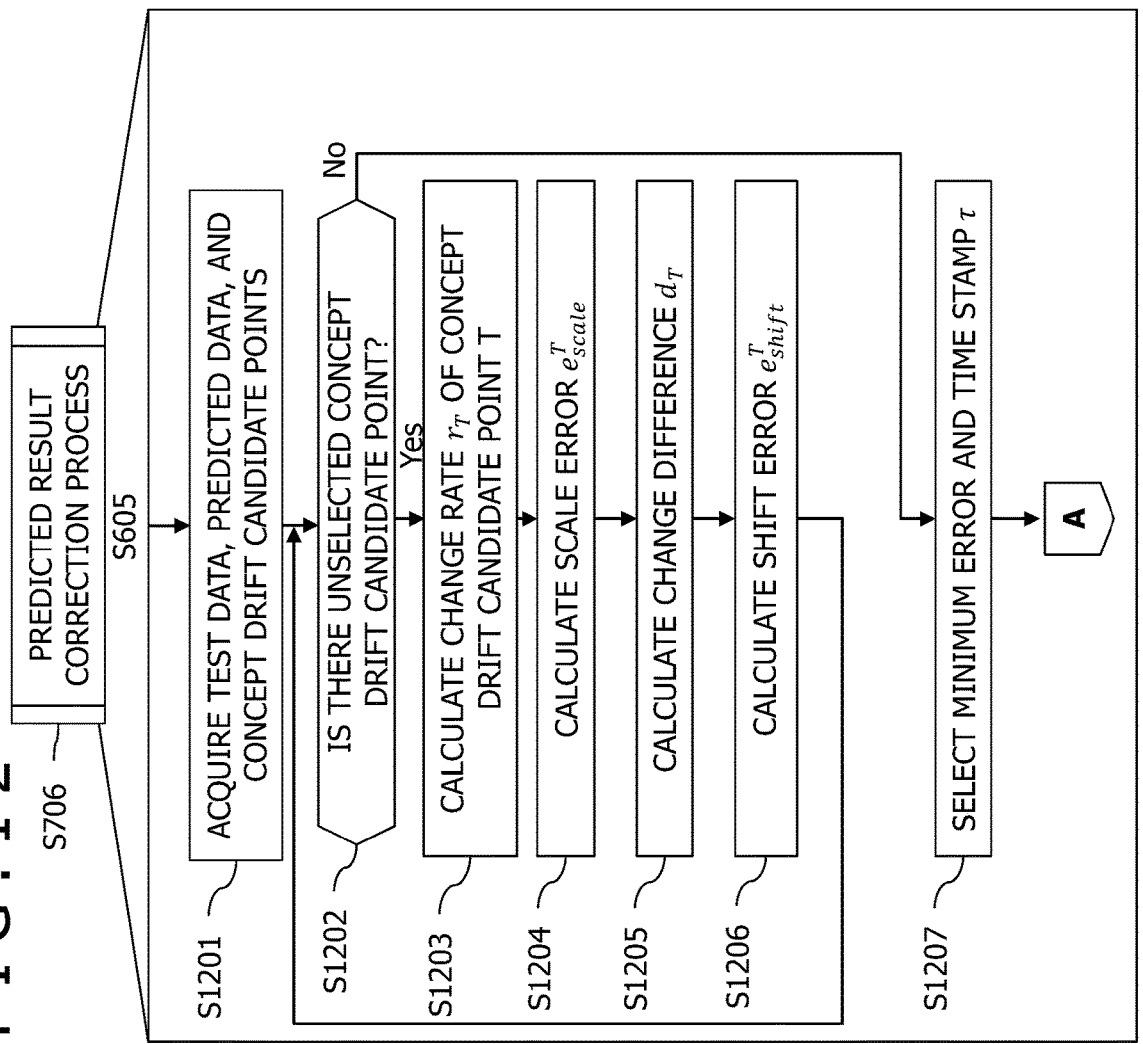
FIG. 12 is a flow chart illustrating a detailed procedure example (first half) of a predicted result correction process (step S706) illustrated in FIG. 7.

FIG. 12 is a flow chart illustrating a detailed procedure example (first half) of the predicted result correction process (step S706) illustrated in FIG. 7. The anomaly detection apparatus 202 acquires the test data, the predicted data, and the concept drift candidate points (step S1201). Next, the anomaly detection apparatus 202 determines whether or not there are unselected concept drift candidate points (step S1202). If there are unselected concept drift candidate points (step S1202: Yes), the anomaly detection apparatus 202 selects one of the unselected concept drift candidate points and sets it as T. The anomaly detection apparatus 202 uses the following Equation (5) to calculate a change rate $r_T$ of the selected concept drift candidate point T (step S1203).

[Math. 3]

$$r_T = \begin{cases} \dfrac{x_{T+1}}{x_T}, & x_T \neq 0 \\ \dfrac{x_{T+1}}{1+x_T}, & x_T = 0 \end{cases} \quad (5)$$

Next, the anomaly detection apparatus 202 uses the following Equation (6) to calculate a scale error $e^T_{scale}$ of the concept drift candidate point T (step S1203).

[Math. 4]

$$e^T_{scale} = \frac{1}{m} \sum_{t=T+1}^{t=T_{end}} \frac{|x_t - r_T * p_t|}{x_t} \quad (6)$$

In Equation (6), m represents the number of time stamps 401 from time T+1 to the analysis end time $T_{end}$ indicated by the time stamps 401. The scale error $e^T_{scale}$ represents an average value of errors between the test data and data that is obtained by scaling (enlarging and reducing) predicted data $p_t$ by the change rate $r_T$ of the concept drift candidate point T.

Next, the anomaly detection apparatus 202 uses the following Equation (7) to calculate a change difference $d_T$ (step S1205).

[Math. 5]

$$d_T = X_{T+1} X_T \quad (7)$$

The anomaly detection apparatus 202 then uses the following Equation (8) to calculate a shift error $e^T_{shift}$ (step S1206) and returns to step S1202.

[Math. 6]

$$e^T_{shift} = \frac{1}{m} \sum_{t=T+1}^{t=T_{end}} \frac{|x_t - p_t + d_T|}{x_t} \quad (8)$$

The shift error $e^T_{shift}$ represents an average value of errors between the test data and data that is obtained by shifting (adding and subtracting) the predicted data $p_t$ by the change difference $d_T$ of the concept drift candidate point T. If there are no unselected concept drift candidate points in step S1202 (step S1202: No), the anomaly detection apparatus 202 selects a minimum error and the time stamp 401 (step S1207) and proceeds to step S1301 of FIG. 13. Specifically, the anomaly detection apparatus 202 selects, for example, the minimum error among the scale errors $e^T_{scale}$ and the shift errors $e^T_{shift}$ of the concept drift candidate points T. The time indicated by the time stamp 401 with the minimum error will be referred to as τ.

For example, assuming that there are three concept drift candidate points T (referred to as T1, T2, and T3), scale errors $e^{T1}_{scale}$, $e^{T2}_{scale}$, and $e^{T3}_{scale}$ and shift errors $e^{T1}_{shift}$, $e^{T2}_{shift}$, and $e^{T3}_{shift}$ are calculated. The anomaly detection apparatus 202 selects the minimum error from among the scale errors $e^{T1}_{scale}$, $e^{T2}_{scale}$, and $e^{T3}_{scale}$ and the shift errors $e^{T1}_{shift}$, $e^{T2}_{shift}$, and $e^{T3}_{shift}$. Assuming that the minimum error is, for example, the scale error $e^{T3}_{scale}$, the anomaly detection apparatus 202 selects, as τ, the concept drift candidate point T3 at which the scale error $e^{T3}_{scale}$ has occurred. The anomaly detection apparatus 202 then proceeds to step S1301 of FIG. 13.

Figure 13:
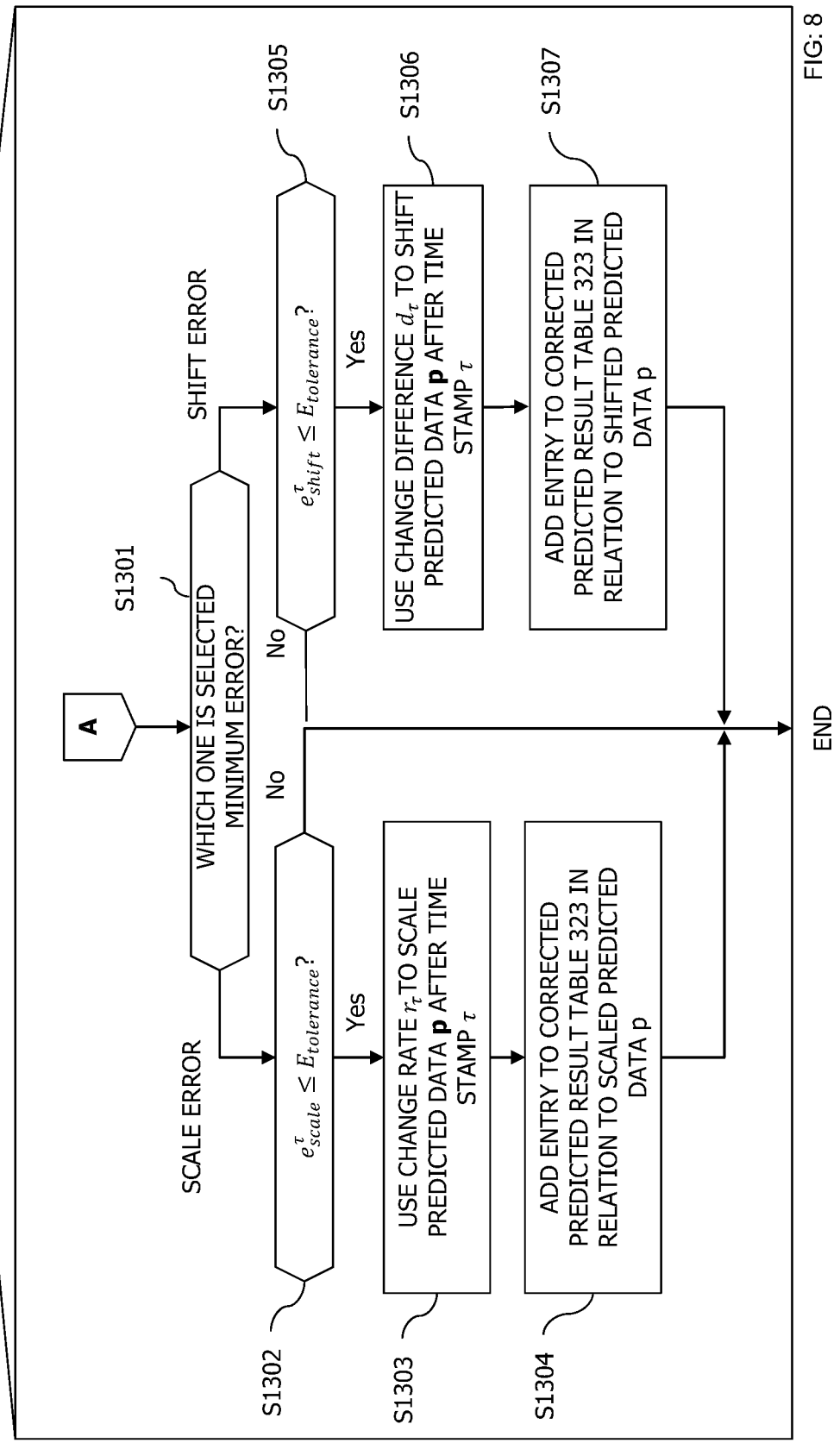
FIG. 13 is a flow chart illustrating a detailed procedure example (second half) of the predicted result correction process (step S706) illustrated in FIG. 7.

Note that, if no concept drift candidate point T is decided or acquired in the concept drift candidate point decision process (step S705), the processes in step S1207 and FIG. 13 are not executed.

FIG. 13 is a flow chart illustrating a detailed procedure example (second half) of the predicted result correction process (step S706) illustrated in FIG. 7. The anomaly detection apparatus 202 determines whether the minimum error selected in step S1207 is a scale error $e^{τ}_{scale}$ or a shift error $e^{τ}_{shift}$ (step S1301). If the selected minimum error is a scale error $e^{τ}_{scale}$ (step S1301: scale error), the anomaly detection apparatus 202 determines whether or not the scale error $e^{τ}_{scale}$ that is the selected minimum error is equal to or smaller than an error tolerance $E_{tolerance}$ (step S1302). If the scale error $e^{τ}_{scale}$ is not equal to or smaller than the error tolerance $E_{tolerance}$ (step S1302: No), the predicted result correction process (step S706) ends.

On the other hand, if the scale error $e^{τ}_{scale}$ is equal to or smaller than the error tolerance $E_{tolerance}$ (step S1302: Yes), the anomaly detection apparatus 202 uses a change rate $r_T$ to scale the predicted data p after time τ indicated by the time stamp 401 (step S1303). In this case, the anomaly detection apparatus 202 also corrects the lower series 503 and the upper series 504 based on the scaled predicted data p. The anomaly detection apparatus 202 then adds an entry of the corrected predicted result table 323 in relation to the scaled predicted data p (step S1304), and the predicted result correction process (step S706) ends.

If the selected minimum error is a shift error $e^{τ}_{shift}$ in step S1301 (step S1301: shift error), the anomaly detection apparatus 202 determines whether or not the shift error $e^{τ}_{shift}$ that is the selected minimum error is equal to or smaller than the error tolerance $E_{tolerance}$ (step S1305). If the shift error $e^{τ}_{shift}$ is not equal to or smaller than the error tolerance $E_{tolerance}$ (step S1305: No), the predicted result correction process (step S706) ends.

On the other hand, if the shift error $e^{τ}_{shift}$ is equal to or smaller than the error tolerance $E_{tolerance}$ (step S1305: Yes), the anomaly detection apparatus 202 uses a change difference $d_τ$ to shift the predicted data p after the time τ indicated by the time stamp 401 (step S1306). In this case, the anomaly detection apparatus 202 also corrects the lower series 503 and the upper series 504 based on the shifted predicted data p. The anomaly detection apparatus 202 then adds an entry of the corrected predicted result table 323 in relation to the shifted predicted data p (step S1307), and the predicted result correction process (step S706) ends.

FIGS. 14 to 16 are explanatory diagrams illustrating scale and shift calculation examples of the concept drift candidate points T. The concept drift candidate point of FIG. 14 is "2021-01-01 01:00:00." The concept drift candidate point of FIG. 15 is "2021-01-01 01:15:00." The concept drift candidate point of FIG. 16 is "2021-01-01 01:30:00."

The minimum error of three scale errors $e^T_{scale}$ and three shift errors $e^T_{shift}$ at these three concept drift candidate points T is the scale error $e^T_{scale}$ = 0.159 at the concept drift candidate point T="2021-01-01 01:00:00" of FIG. 14. Therefore, the scale error $e^T_{scale}$ is selected as the minimum error, and the concept drift candidate point T="2021-01-01 01:00:00" that is the time stamp 401 is selected as T (step S1207). The time stamps 401 and the scaled predicted data of entries 1401 to 1403 are registered in the corrected prediction table.

In this way, according to the anomaly detection apparatus 202 described above, a scale transformation is applied to the disk usage 402 by a factor of 1/k when the capacity of the disk is increased by a factor of k in the IT infrastructure 201, for example. A scale transformation is applied to the disk usage 402 by a factor of k when the capacity of the disk is reduced by a factor of k. When a large amount of log files are unexpectedly deleted, a shift transformation is applied to reduce the disk usage 402 accordingly. When a large amount of files are copied to the backup storage, a shift transformation is applied to increase the disk usage 402 accordingly.

Therefore, the promptness of the anomaly detection is improved even after the occurrence of a specific event that causes a concept drift, and an anomaly report of the IT system can be output promptly and periodically such as every day or every hour. Therefore, the anomaly detection does not stop after the occurrence of the specific event, and false detection, such as detecting that the system is normal when the system is anomalous and detecting that the system is anomalous when the system is normal, can be suppressed.

Although the anomaly detection apparatus 202 selects the linear transformation of either the scale transformation or the shift transformation to correct the predicted data, the anomaly detection apparatus 202 may be provided with only the linear transformation of either the scale transformation or the shift transformation.

The anomaly detection apparatus 202 described above can also be configured as in the following (1) to (9).

(1) An anomaly detection apparatus 202 includes a processor 301 that executes a program and a storage device 302 that stores the program. The processor 301 executes a correction process (step S706) of applying a scale transformation to correct second predicted data in time-series first predicted data (for example, predicted data of time t1 to t3 illustrated in FIG. 1A to 1C) of a monitoring target (for example, disk usage 402), the second predicted data including data after occurrence time T (for example, time t2 in FIG. 1A to 1C) of a specific event, and a detection process (step S707) of detecting an anomaly of the monitoring target based on the second predicted data (for example, predicted data of time t2 to t3 illustrated in FIG. 1A to 1C) corrected in the correction process and based on second measured data (for example, test data of time t2 to t3 illustrated in FIG. 1A to 1C) in time-series first measured data (for example, test data of time t1 to t3 illustrated in FIG. 1A to 1C) of the monitoring target, the second measured data including data after the occurrence time T of the specific event.

(2) In the anomaly detection apparatus 202 according to (1), the processor 301 uses a change rate $r_τ$ of the second measured data to apply the scale transformation to correct the second predicted data in the correction process (step S706).

(3) In the anomaly detection apparatus 202 according to (1), the processor 301 applies a linear transformation of either the scale transformation or a shift transformation to correct the second predicted data in the correction process (step S706).

(4) In the anomaly detection apparatus 202 according to (1), the processor 301 uses, in a case where the scale transformation is selected, a change rate $r_τ$ of the second measured data to apply the scale transformation to correct the second predicted data and uses, in a case where the shift transformation is selected, a difference $d_\tau$ of a change in the second measured data to apply the shift transformation to correct the second predicted data in the correction process.

(5) In the anomaly detection apparatus 202 according to (4), the processor 301 calculates a scale error $e^\tau_{scale}$ between the second measured data and the second predicted data that is enlarged and reduced by the change rate $r_\tau$, and calculates a shift error $e^\tau_{shift}$ between the second measured data and the second predicted data that is shifted by the difference $d_\tau$ of the change, to select the linear transformation of either the scale transformation or the shift transformation based on the scale error $e^\tau_{scale}$ and the shift error $e^\tau_{shift}$ in the correction process (S706).

(6) In the anomaly detection apparatus 202 according to (5), the processor 301 selects the linear transformation with a smaller error between the scale error $e^\tau_{scale}$ and the shift error $e^\tau_{shift}$ in the correction process (step S706).

(7) In the anomaly detection apparatus 202 according to (1), the processor 301 executes, for each change rate $r_t$ of measured values at observation time t of the first measured data, a decision process (step S705) of deciding that specific observation time t larger than a change rate threshold $R_{threshold}$ (step S805: Yes) is an occurrence time candidate T of the specific event, and the processor 301 applies, in the correction process (step S706), the scale transformation to correct the second predicted data including data after any one occurrence time candidate τ among occurrence time candidates T of the specific event decided in the decision process (step S705).

(8) In the anomaly detection apparatus 202 according to (7), the processor 301 decides in the decision process (step S705) that the specific observation time t is the occurrence time candidate T of the specific event, in a case where an error E between the first predicted data and the first measured data is larger than an error threshold $E_{threshold}$ (step S803: Yes).

(9) In the anomaly detection apparatus 202 according to (7), the processor 301 counts, in the decision process (step S705), the number of appearances $f_r$ of the change rate $r_t$ of the measured values at the specific observation time t, the number of appearances $f_r$ corresponding to a predetermined period, and decides that the specific observation time t corresponding to the change rate $r_t$ of the measured values with the number of appearances $f_r$ smaller than a number-of-appearances threshold $F_{threshold}$ is the occurrence time candidate T of the specific event.

Note that the present invention is not limited to the abovementioned embodiment, and the present invention includes various modifications and equivalent configurations within the scope of the attached claims. For example, the embodiment is described in detail to facilitate the understanding of the present invention, and the present invention may not necessary be limited to the embodiment including all of the configurations. In addition, part of the configuration of an embodiment may be replaced with the configuration of another embodiment. The configuration of an embodiment may be added to the configuration of another embodiment. Another configuration may be added to, deleted from, or replace part of the configuration of an embodiment.

Part or all of the configurations, the functions, the processing units, the processing means, and the like may be, for example, designed in an integrated circuit to realize them in hardware, or they may be realized in software by the processor 301 interpreting and executing a program for realizing the functions.

Information such as programs, tables, and files, for realizing the functions can be stored in a storage device such as a memory, a hard disk, and a solid state drive (SSD), or in a recording medium such as an integrated circuit (IC) card, a secure digital (SD) card, and a digital versatile disc (DVD).

Control lines and information lines considered to be necessary for the description are illustrated, and not all of the control lines and the information lines necessary for the implementation may be illustrated. It can be considered that most of the components are connected to each other in practice.

What is claimed is:

1. An anomaly detection apparatus comprising: a processor that executes a program; and a storage device that stores the program, wherein the processor executes a correction process of applying a scale transformation to correct second predicted data in time-series first predicted data of a monitoring target, the second predicted data including data after occurrence time of a specific event, a detection process of detecting an anomaly of the monitoring target based on the second predicted data corrected in the correction process and based on second measured data in time-series first measured data of the monitoring target, the second measured data including data after the occurrence time of the specific event, and a linear transformation based on at least one of a change rate of the second measured data to apply the scale transformation, the scale transformation, and a shift transformation to correct the second predicted data in the correction process.

2. The anomaly detection apparatus according to claim 1, wherein the processor uses,
    in a case where the scale transformation is selected, a change rate of the second measured data to apply the scale transformation to correct the second predicted data; and
    in a case where the shift transformation is selected, a difference of a change in the second measured data to apply the shift transformation to correct the second predicted data in the correction process.

3. The anomaly detection apparatus according to claim 2, wherein the processor calculates
    a scale error between the second measured data and the second predicted data that is enlarged and reduced by the change rate, and
    a shift error between the second measured data and the second predicted data that is shifted by the difference of the change, to select the linear transformation of either the scale transformation or the shift transformation based on the scale error and the shift error in the correction process.

4. The anomaly detection apparatus according to claim 3, wherein the processor selects the linear transformation with a smaller error between the scale error and the shift error in the correction process.

5. The anomaly detection apparatus according to claim 1, wherein the processor
    executes, for each change rate of measured values at observation time of the first measured data, a decision process of deciding that specific observation time larger than a change rate threshold is an occurrence time candidate of the specific event, and
    applies, in the correction process, the scale transformation to correct the second predicted data including data after any one occurrence time candidate among occurrence time candidates of the specific event decided in the decision process.

6. The anomaly detection apparatus according to claim 5, wherein the processor decides in the decision process that the specific observation time is the occurrence time candidate of the specific event, in a case where an error between the first predicted data and the first measured data is larger than an error threshold.

7. The anomaly detection apparatus according to claim 5, wherein the processor
- counts, in the decision process, the number of appearances of the change rate of the measured values at the specific observation time, the number of appearances corresponding to a predetermined period, and
- decides that the specific observation time corresponding to the change rate of the measured values with the number of appearances smaller than a number-of-appearances threshold is the occurrence time candidate of the specific event.

8. An anomaly detection method executed by an anomaly detection apparatus including a processor that executes a program and a storage device that stores the program, the method comprising: executing, by the processor, a correction process of applying a scale transformation to correct second predicted data in time-series first predicted data of a monitoring target, the second predicted data including data after occurrence time of a specific event, a detection process of detecting an anomaly of the monitoring target based on the predicted data corrected in the correction process and based on second measured data in time-series first measured data of the monitoring target, the second measured data including data after the occurrence time of the specific event and a linear transformation based on at least one of a change rate of the second measured data to apply the scale transformation, the scale transformation, and a shift transformation to correct the second predicted data in the correction process.

9. A method for detecting anomalies comprising: executing, with a processor a correction process of applying a scale transformation to correct second predicted data in time-series first predicted data of a monitoring target, the second predicted data including data after occurrence time of a specific event, a detection process of detecting an anomaly of the monitoring target based on the predicted data corrected in the correction process and based on second measured data in time-series first measured data of the monitoring target, the second measured data including data after the occurrence time of the specific event, and a linear transformation based on at least one of a change rate of the second measured data to apply the scale transformation, the scale transformation, and a shift transformation to correct the second predicted data in the correction process.

* * * * *